Figure 1:
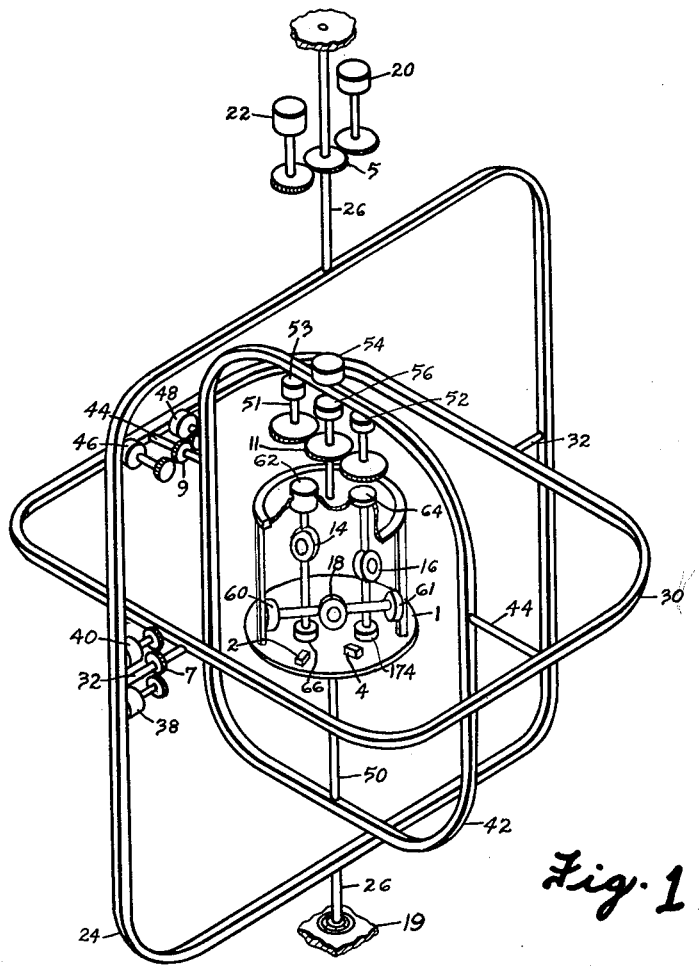

Jan. 19, 1965   W. H. HEATH ETAL   3,165,927
VERTICAL INDICATING AND NAVIGATION SYSTEM
Filed May 12, 1954   4 Sheets-Sheet 1

INVENTORS
WILLIAM H. HEATH   YVES NUBAR
GEORGE ARSHAL   JOHN R. WHITE
STEWART REINER   DAVID C. HUGHES

BY
ATTORNEYS

INVENTORS
WILLIAM H. HEATH    YVES NUBAR
GEORGE ARSHAL      JOHN R. WHITE
STEWART REINER      DAVID C. HUGHES
BY
ATTORNEYS

Jan. 19, 1965   W. H. HEATH ETAL   3,165,927
VERTICAL INDICATING AND NAVIGATION SYSTEM
Filed May 12, 1954   4 Sheets-Sheet 4

INVENTORS
WILLIAM H. HEATH   YVES NUBAR
GEORGE ARSHAL   JOHN R. WHITE
STEWART REINER   DAVID C. HUGHES
BY
ATTORNEYS

3,165,927
VERTICAL INDICATING AND NAVIGATION SYSTEM

William H. Heath, New York, Yves Nubar, Mount Vernon, George Arshal, Jamaica, Stewart Reiner, New Rochelle, and David C. Hughes, New York, N.Y., and John R. White, Los Angeles, Calif., assignors, by mesne assignments, to the United States of America as represented by the Secretary of the Navy
Filed May 12, 1954, Ser. No. 429,418
2 Claims. (Cl. 73—178)

This invention relates in general to navigational systems and more particularly to the generation of the local vertical to assist in the accurate determination of the true orientation and position of a land, sea or air vehicle.

In all navigational problems wherein the exact position of an object is required, the direction of down or the local vertical must be known. This one item of information is essential and cannot be dispensed with. Without the local vertical, or the horizontal, the angles between the various stars can not be obtained and thus the position of the vehicle can not be obtained. It is therefore obvious that the accuracy of the calculated orientation and position of a vehicle is largely dependent upon the accuracy of the generated local vertical. To persons experienced in the art it is obvious that an accurately generated local vertical can form the heart of a very accurate automatic navigational system by establishing an absolutely level area or platform upon which cameras or other equipment may be mounted.

The vertical at any location on the earth's surface can be defined as follows: Let the location be identified by a point P. A plumb line is hung freely, at rest with respect to the earth, so that the plumb bob is at the point P. The vertical at P is by definition the direction of the plumb line. This line is the direction of the resultant of two forces on the plumb mass: the earth's attraction and the equivalent inertial force originating from the earth's rotation. One acts along the line joining the mass center of the earth and that of the plumb, the other along a line through the plumb mass center, perpendicular to and passing through the earth spin axis. The magnitude of their resultant, or equivalently, the tension in the plumb line, defines the gravity force $mg$, where $m$ is the mass of the bob and $g$ is the "acceleration due to gravity." The manifold of lines thus defined for the points of the earth's surface, emanating from and fixed with respect to it, constitutes the definition of the vertical for all points of the earth's surface. The line for any particular point is called the "local vertical" at that point.

For a point in the aircraft at any instant, the local vertical is that line of the manifold that contains the point. This is the definition of the local vertical at a point that is not on the earth's surface; it differs very slightly from the direction of a plumb line at a normal altitude, the mass of which would experience earth attraction and centrifugal forces different from those at the earth's surface. This difference amounts to about .02 minute of arc at 50,000 feet of altitude.

Conceiving the vertical as a unit in a plurality of lines emanating from and fixed with respect to the earth's surface clarifies the problem and emphasizes one significant aspect of it: The fixed point in an aircraft is visualized as moving in an arbitrary motion through a space that surrounds the earth's surface and that is filled with the manifold of lines; the point is associated with one of these lines at every instant. The motion of the point relative to the earth, and consequently to the manifold of lines, causes the local vertical at the point to vary. Specifically, this variation is a function of how the point moves and where it is situated with respect to the earth.

This invention is a precision navigational system that utilizes inertial information and ground velocity information as inputs. These inputs are converted into torques of appropriate character that are applied to a platform in an appropriate manner so as to null its pitch and roll angles continuously with respect to the horizontal plane. Inertial information that consists in accelerations and rates of rotation is measured by accelerometers and gyros that are installed on the platform, while the ground velocity is measured and is transferred to the platform and resolved along its axes. In an aircraft the ground velocity can be obtained by means of doppler-radar, optical, or other means of instrumentation. More precisely, this invention subtracts from the total acceleration the path acceleration component as is obtained by ground velocity indicator means and obtains a voltage that is proportional to the sine of the roll (or pitch) angle with "$g$," the gravity acceleration, as a factor of proportionality.

The total acceleration component is the resultant of all the accelerations including the acceleration that is due to gravity that acts upon the vehicle. The path acceleration component is the resultant of those accelerations that cause a point to describe a particular path with respect to earth. Said path acceleration component includes the accelerations that result from winds, up drafts, down drafts, engine thrust, movement of aircraft controls and the like, but does not include the acceleration that is due to gravity. Control torques that are properly shaped as a function of these angles or errors, are applied to gyros in order to erect them to the vertical. The platform is then subjected to a high gain torque to follow the gyros for the purpose of nulling the roll and pitch angles thus generating an accurate "vertical."

The accurately generated vertical is then utilized in mapping procedures, navigational problems and the like. When mapping, instruments of the proper nature are connected to the stabilized platform to indicate the deviation of the airplane from the true horizontal plane. Thus the angular deviation of cameras that are mounted to the airplane is known at each instant. Knowing the angular deviation of the cameras when the photographs of the area below were taken, then said photographs can be quickly and accurately rectified to produce a true picture of the area photographed.

In the solution of navigational problems, the stabilized platform is connected to the appropriate instruments to aid in the accurate measurement of the vertical angles to and between the required stars. Thus, the stabilized platform that contains an accurately generated local vertical, aids in providing a necessary ingredient for the solution of all navigational problems.

It is an object of the present invention is determine accurately the position of a vehicle.

It is another object to generate accurately the local vertical at each position.

It is an additional object to utilize ground velocity information to continuously determine the true vertical of a moving vehicle.

Another object of the present invention is to continuously generate the true position of a moving vehicle that is independent of the configuration of the earth's surface.

It is still another object to provide a very accurate navigational system that is not adversely influenced by mild maneuvers or erratic flight conditions.

Figure 3:
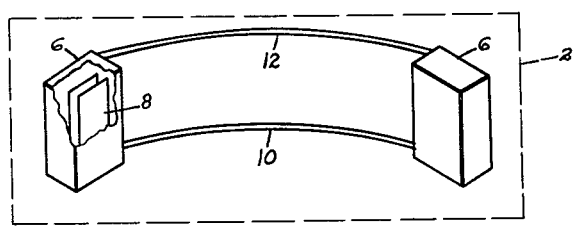
Figure 4:
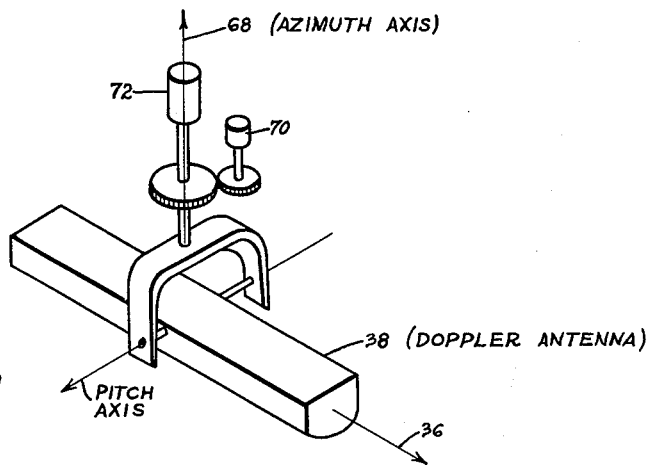
Figure 2:
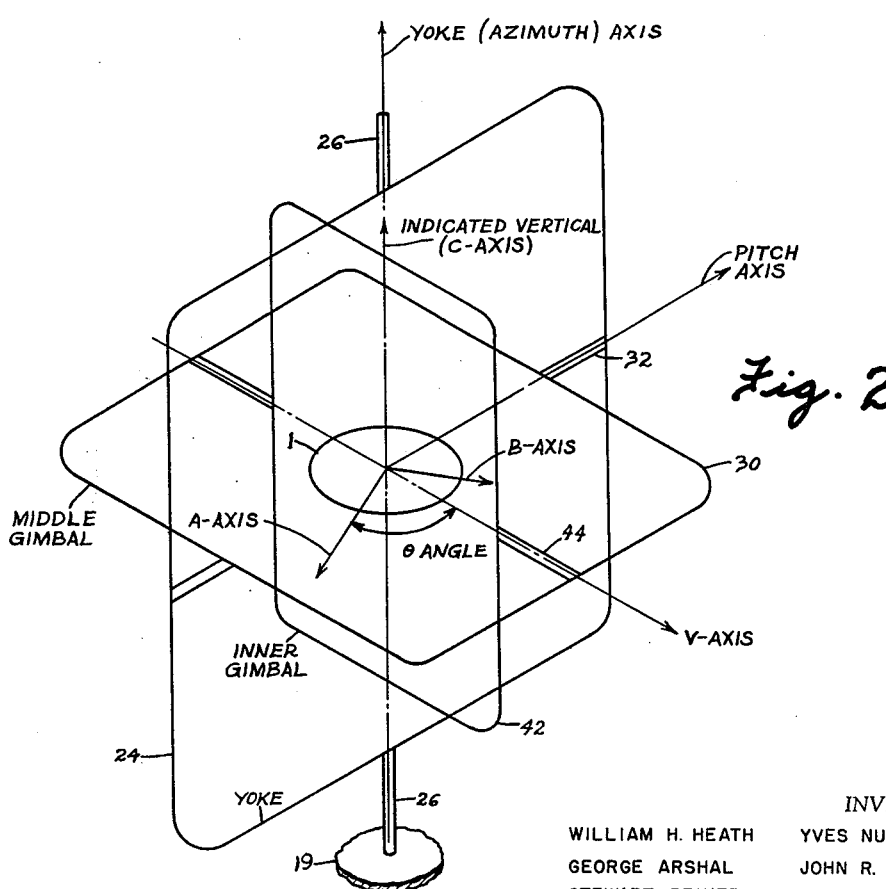
Figure 5A:
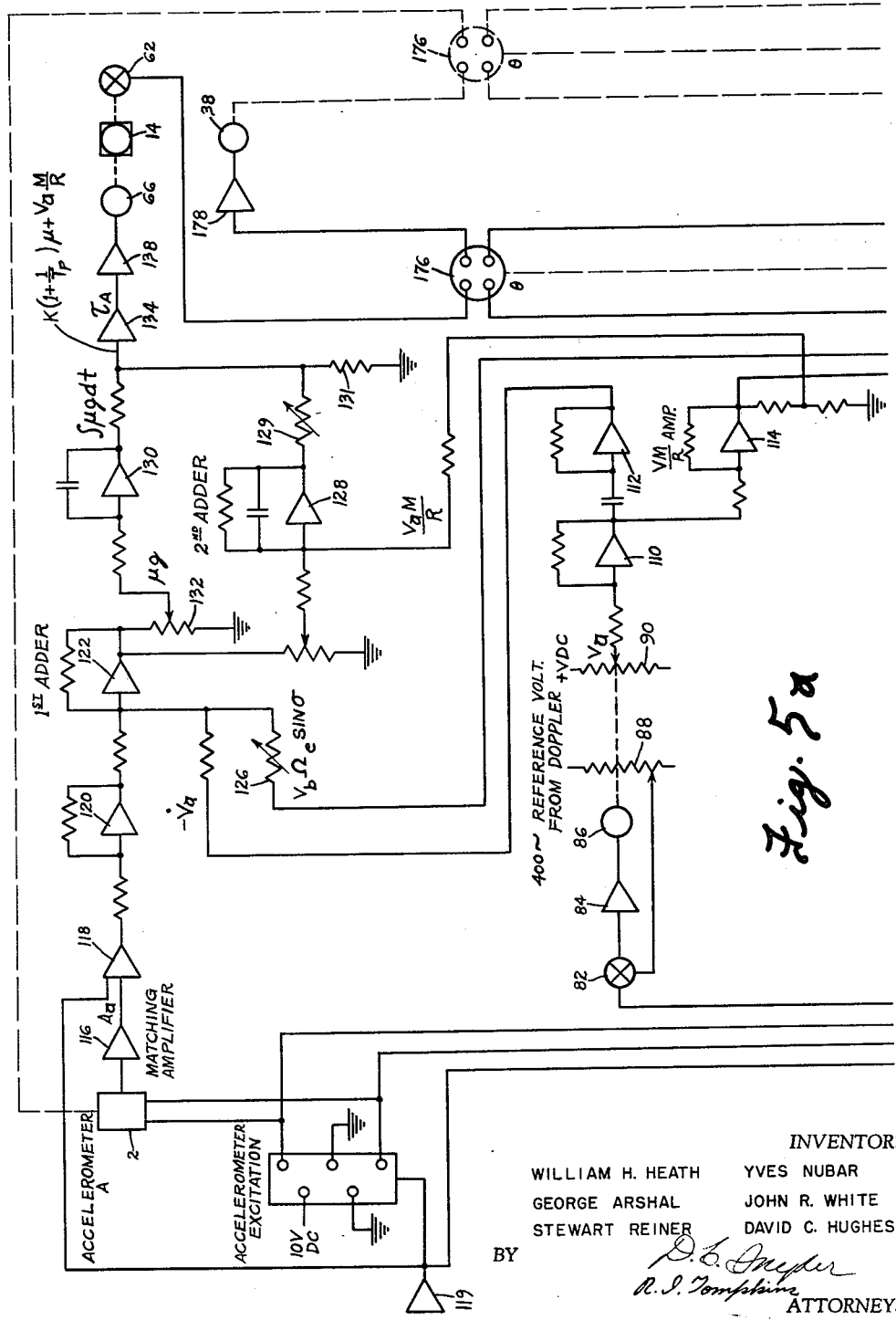
Figure 5B:
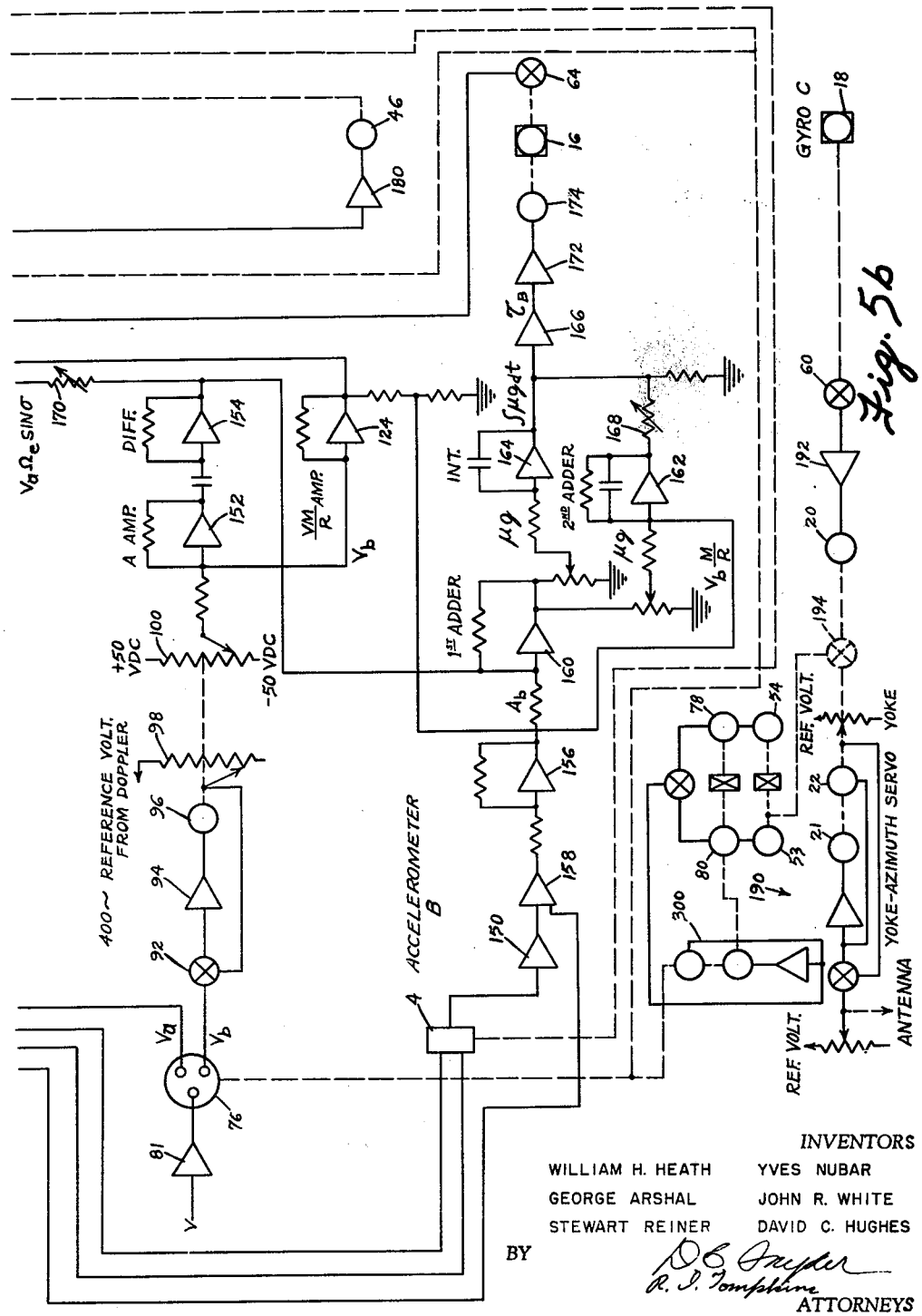

Other objects and many of the attendant advantages of this invention will be readily appreciated as the same becomes better understood by reference to the following detailed description when considered in connection with the accompanying drawings wherein:

FIG. 1 is a perspective view of the stable element,
FIG. 2 is a schematic view of stable element,
FIG. 3 is a view of the liquid accelerometer, FIG. 4 is a pictorial view of the Doppler antenna, and FIGS. 5a and 5b combined show the schematic of the computer section.

Referring to FIG. 2 therein is shown the stabilized platform 1 of this device as it is defined by the three orthogonal axes A, B and C. The C axis serves as the indicated vertical and is driven toward coincidence with the local vertical vector when the system is in operation. Referring to FIG. 1, two accelerometers 2 and 4 are mounted on the platform 1 and they are rigidly aligned so that their outputs are a measure of the components of the total acceleration vector in the directions A and B. The accelerometers 2 and 4 are identical in construction and are in reality liquid pendulums. Referring to FIG. 3 wherein an accelerometer is shown in greater detail, each box 6 contains a plurality of capacitor plates 8. The boxes 6 are partially filled with a dielectric fluid and are interconnected by means of two tubes 10 and 12. The tube 10 allows the dielectric fluid to flow from one box 6 to the other box. The tube 12 is the air return tube. The capacitors 8 that are within each box 6 are connected to each other in series. A 200 cycle excitation input voltage is impressed across the series combination. The 200 cycle output voltage is obtained from the lead that interconnects the two condensers.

There are many means that will determine the acceleration of a body. This device can operate by the utilization of any one or a combination of said acceleration measuring means. The reference to a liquid accelerometer is for illustrative purposes only and is not intended as a limitation. To one experienced in the art it is obvious that one type of accelerometer may be substituted for another type with no alteration of the basic concept of this invention. This invention, therefore, should not be restricted to the utilization of liquid accelerometers for the measurement of components of the total acceleration vector in the required plane.

Three gyros 14, 16 and 18 are also mounted on the platform 1. The basic purpose of these gyros is to allow the angular orientation of the platform to be controlled in inertial space by the application of torques on the proper gyro axes to bring about the desired rates of rotation through precession. Such a purpose requires the use of gyros as control elements as being the best existing instruments with adequate stability and accuracy characteristics. The spin axis of the gyro 14 falls along the axis in which accelerometer 2 measures acceleration; the spin axis of the gyro 16 falls along the axis in which accelerometer 4 measures acceleration; and the spin axis of the gyro 18 is in the plane of axes A and B which plane is above and parallel to that of the platform 1. This spin axis is at a 45 degree angle to each of the other gyro spin axes. FIG. 1 clearly shows the placement of the gyros and accelerometers.

Referring to FIG. 1, the stable element is a three gimbal structure that is enclosed within a dust proof case 19 that has been cut away to expose the interior structure. The case 19 gives support to the stator of the yoke azimuth servo motor 20, the stator of the yoke azimuth angle indicating device such as a potentiometer 22, and also serves as the support of yoke or outer gimbal 24 through the yoke axis shafts 26 and bearings. The outer case 19 is mounted within a vehicle such as an airplane so that the yoke axis is in a vertical position when the vehicle is in normal motion without roll or pitch.

The yoke gimbal 24 in its normal position, lies in a plane that is perpendicular to the normal axis of travel or motion of the vehicle as is illustrated in the FIG. 1. Said yoke gimbal is rotatable about the yoke axis 26 relative to the case through an angle of approximately plus and minus twenty-five degrees before contacting yoke gimbal stops that are mounted on the case. The stops consist of any simple studs, pins or protruding projections and are not shown or illustrated in the drawings.

The yoke 24 serves a plurality of purposes. Said yoke supports the middle gimbal 30 by means of a pair of rotatable shafts 32. The yoke also allows the V-axis of the platform 1 as illustrated in FIG. 2 to be positioned in the horizontal plane so that it is parallel to the Doppler antenna horizontal velocity axis 36 of FIG. 4. Returning to FIG. 1, said yoke 24 also supports the stator of the pitch servo motor 38 and the pitch synchro transmitter 40.

The middle gimbal 30 supports the inner gimbal 42 by means of the two rotatable coaxial shafts 44 on the V-axis. Said gimbal 30 also supports the stator of the V-axis servo motor 46 and the V-axis synchro transmitter 48.

The inner gimbal 42 supports the stable platform 1 by means of the shaft 50 that is rotatably connected to the inner gimbal ring 42. Said inner gimbal ring 42 also supports the stator of the C-axis servo motor 52, the C-axis ($\theta$ angle) synchro transmitter 54, and the gyro pick-off error resolver 56.

Said shafts 26, 32, 44, and 50 are rotatably mounted to the case 19, yoke 24, middle gimbal 30, and inner gimbal 42 respectively; and are rigidly connected at their other extreme, by any convenient means, to the yoke 24, middle gimbal 30, inner gimbal 42 and platform 1 respectively. The gears 5, 7, 9 and 11 are rigidly attached to the shafts 26, 32, 44 and 50 respectively so that there is no relative motion between said shafts and said associated gears.

The above mentioned gimbal system, through the action of the gyros and the gimbal axis servos, isolates the platform from the rotational motion of the moving vehicle. Servo motors 20, 38, 46 and 52 act as a means to maintain the platform in an erect position irrespective of movements of the aircraft.

In operation, the C-component of the inertial angular velocity of the stable platform is driven toward null. This is accomplished in the following manner. At the instant an input torque tends to rotate the platform 1 about the C-axis, said movement is resisted by the platform inertia and, much more strongly, by an equal and opposite gyroscopic torque from the C-gyro 18. In resisting the input torque the C-gyro 18 precesses about its gimbal axis through an angle that is proportional to the integral of the input torque, causing an electrical signal to be generated in the C-gyro pick-off 60. This signal is amplified in the C-axis servo amplifier and is then fed into the C-axis servo motor 52. Said servo motor generates a counter torque on the platform 1 that tends to rotate the platform in a direction that is opposite to the direction of rotation that results from the input torque. As the servo motor torque on the platform builds up it becomes equal to the input torque, thus reducing the sum of torques on the platform to null, and preventing further precession of the C-gyro 18 that has prevented rotation of the platform about the C-axis by generating the gyroscopic torque. The torque motor 61 cooperates with and is connected to the C gyro 18.

Input torques about the A- and B-axes are nulled in a similar manner as the torques about the C-axis; however the counter torques are generated about the pitch and V-axes by the respective servo motors. Because the A- and B-axes may have an arbitrary orientation relative to the pitch and V-axes, it is necessary to resolve the signals from the A and B gyro pickoffs 62 and 65 respectively into their components in the plane of the A- and B-axes along and perpendicular to the V-axis. This is done in the gyro pickoff error resolver 56. After this resolution the V-axis servo motor generates the correct counter-torque, as does the pitch-axis servo motor 38 when the pitch-axis lies in the AB-plane. When the pitch axis is rotated out of the AB-plane the torque generated by the pitch-axis servo motor 38 can be slightly in error and causes some input torque on the C-axis of the platform.

The C-axis of the platform can be rotated in to an arbitrary direction by causing the platform to rotate about the A- and B-axes. This is accomplished as follows:

If it is desired to rotate the platform about the B-axis, a torque is produced on the A-gyro precession axis by putting the proper electrical signal across the input terminals of the A-gyro torque motor 66. The gyro does not rotate about its precession axis because of this torque. Instead it generates an equal and opposite torque and in so doing begins to precess about the B-axis of the platform at a rate that is proportional to the precession axis torque. Since the gyro is rigidly attached to the platform in this degree of rotational freedom it carries the platform with it, thus producing the required rotational rate. Rotations about the A-axis are produced in an analogous manner utilizing the B gyro 16 and the B gyro torque motor 174.

Thus, the platform can be considered as an element that allows the accelerometers to be rotated relative to inertial space at controlled angular velocities. The accelerometers 2 and 4 are positioned with a minimum of disturbances that are due to aircraft rotations that are relative to inertial space.

The measure of the components of the aircraft horizontal velocity relative to the earth is required to drive the C-axis toward the local vertical. The measure of the velocity components is obtained from Doppler radar equipment. The doppler radar that is used in the present system is a device that measures, with high accuracy, the long time (three to five minute) average of the component of the velocity of the aircraft along the Doppler horizontal velocity axis 36. The outputs that define this component of velocity are a four hundred cycle modulated carrier signal that is proportional to the magnitude of the component speed and an angle (Doppler antenna azimuth angle) through which the Doppler antenna is turned relative to the aircraft in order to align the antenna horizontal velocity axis 36 with the direction of the aircraft velocity. The Doppler antenna azimuth (Doppler yoke) axis 68 is rigidly installed parallel to the platform yoke axis 26. In the present invention this is accomplished by mounting the platform and the Doppler antenna on a very rigid cradle that is isolated from aircraft flexure by a three point suspension.

There are many means that are well known to those experienced in the art that can be utilized to determine the true ground velocity of a vehicle. To those that are experienced in the art it immediately becomes obvious that other methods such as optical and the like may be utilized to determine the true ground speed of a vehicle without altering or deviating from the scope of the present invention.

Referring to FIG. 2 and FIG. 4, the mechanical configuration of the platform yoke and the V-axis is similar to the Doppler yoke and the horizontal velocity axis 36. Thus, if the Doppler horizontal velocity axis 36 were restrained to the same pitch angle as the V-axis, and if the platform yoke were turned through the same angle relative to the aircraft as is the Doppler yoke, then the V-axis would fall along a line that is always parallel to the Doppler horizontal velocity axis 36. The Doppler antenna and the platform yoke contain the required mechanical elements consisting of servo motors 70 and 20 respectively and angle transmitters 72 and 22 respectively to accomplish the required slaving.

By slaving the antenna in pitch to the pitch of the platform, the Doppler measures the horizontal velocity component when the platform is driven to horizontal. The Doppler yoke is the prime source of the motion direction information, therefore the platform yoke is slaved to the Doppler yoke. The necessary slaving of one element to another is accomplished by means of the standard conventional servo system that is well known to those experienced in the art. Although not shown, elements for slaving about the pitch axis could be the same as 70, 20 and 72, 22 respectively for slaving about the azimuth axis.

Under actual slaving conditions, the V-axis is aligned parallel to the Doppler velocity axis 36. The four hundred cycle modulated carrier from the Doppler is proportional to the aircraft speed along this direction. To obtain the components of this velocity along the A- and B-axes it is necessary to resolve the 400 cycle carrier through the angle $\theta$. Thus, the A- and B-components are $V \cos \theta$ and $V \sin \theta$ respectively. Referring to FIGS. 5a and 5b the A- and B-components are obtained in the following manner: the stators of two synchros 54 and 53 are fixed to the inner gimbal 42 and their rotors are connected to the platform 1 by means of the shaft 51 through the gear ratios of 1:1 and 27:1 respectively. The actual gearing is not shown nor illustrated but may be accomplished in any conventional manner.

The shaft of the resolver 76 is rotated through the angle $\theta$, by means of the true heading servo system 300, by comparing this shaft rotation in a conventional fine coarse 1:1, 27:1 synchro pair 78, and 80 with the signal transmitted from the fine course synchro pair 54, 53 that is geared to the platform C-axis ($\theta$ angle) shaft. The yoke-azimuth servo system 190 and the azimuth motor 21, are connected to the synchros 78 and 80 through a differential gear arrangement 194 and the synchros 53 and 54. The platform azimuth motor 20 is electrically connected to the gyro C pickoff 60 through the amplifier 192. The rotor of the gyro pickoff 60 is mechanically connected to indicate deviations of the C gyro 18.

The four hundred cycle carrier from the Doppler is fed into a resolver driver scale factor amplifier 81 and then to the rotor winding of the resolver 76. The A- and B-components appear across the stator windings of the resolver in the form of four hundred cycle modulated carrier signals.

Before this information can be utilized in the computer section of this device the carrier signal components must be demodulated. Since each carrier component is operated upon in an identical manner, the operation on the $V \cos \theta$ component, only, will be described.

The four hundred cycle $V \cos \theta$ component from the resolver 76 is fed into a dicerence detector 82 and then into a servo amplifier 84 that causes a demodulator servo motor 86 to turn a reference potentiometer 88. An in-phase four hundred cycle reference from the doppler radar is maintained across the terminals of said resistor 88. The voltage from the output arm of the reference potentiometer 88 is fed back to the difference detector 82 and is compared with the incoming $V \cos \theta$ voltage. This arrangement results in the positioning of the contact of the potentiometer 88 to some angle that is proportional to the voltage $V \cos \theta$ regardless of the line voltage fluctuations that are present in the doppler radar line. The arm of a second potentiometer 90 is mechanically connected to the arm of potentiometer 88 so that both arms transverse the same distance at the same instant. A D.C. potential of approximately 50 volts is maintained across said potentiometer 90. A D.C. voltage signal that is proportional to $V \cos \theta$ appears across the contact arm of the potentiometer 90 and ground.

A D.C. signal that is proportional to the B-axis component $V \sin \theta$ is generated in a similar manner as described above for the $V \cos \theta$ component and therefore said description will not be repeated. However the demodulation circuit for the $V \sin \theta$ voltage component consists of the difference detector 92, servo amplifier 94, servo motor 96 and two potentiometers 98 and 100. For convenience, the term $V \cos \theta$ will henceforth be represented by $V_a$.

The roll and pitch control torques, $\tau_{A1}$ and $\tau_{A2}$, respectively, that are impressed upon the gyros may be written as follows:

$$\tau_{A1} = K_1\left(1 + \frac{1}{T_1 p}\right)\frac{1}{g}(A_a - \overset{\circ}{V}_a - V_c\Omega_b + V_b\Omega_e \sin \sigma) + V_a\frac{M}{R}$$

$$\tau_{A2} = K_2\left(1 + \frac{1}{T_2 p}\right)\frac{1}{g}(A_b - \overset{\circ}{V}_a + V_c\Omega_a - V_a\Omega_e \sin \sigma) + V_b\frac{M}{R_g}$$

wherein:

$K_1$ and $K_2$ are constants that relate angle to torque
$g$ is acceleration due to gravity
$A_a$ and $A_b$ represent acceleration measured by accelerometers oriented in the $A_a$ and $A_b$ directions respectively
$V_a$, $V_b$, $V_c$ represent velocity of the aircraft relative to the ground resolved in the $A_a$, $A_b$ and $A_c$ directions respectively
$\Omega_a$, $\Omega_b$ angular rates about the $A_a$ and $A_b$ axes of set $\overline{A}$ (platform) with respect to inertial space,
$\Omega_e$ rate of earth rotation
$\sigma$ latitude, supplied manually
$M$ angular momentum of gyro to which torque is applied
$R_g$ radius of the earth
$T_1$, $T_2$ integrating time constant
$p$ mathematical operator
$^\circ$ first derivative with respect to time The term $-V_c\Omega_b$ of the first equation and the term $+V_c\Omega_a$ of the second equation were not considered in the solution of the equations associated with the roll and pitch control torques. Said terms represent the vertical velocity. Under mild evasive maneuvers the value of these terms is negligible and do not materially contribute to the value of the control torques. It is here noted, however, that if this device were used in conjunction with a vehicle that greatly varies its altitude rapidly, then said deleted terms would have to be considered. An example of vehicles that can go through large variations in altitude rapidly are rockets, fighter planes and the line.

The solutions of the first and second equations are essentially identical in character. The solution of the first equation will now be considered in detail.

The various amplifiers that are used for the purpose of addition, integration, multiplication and differentiation are all D.C. amplifiers that are essentially similar in internal design and construction. Each amplifier, however, contains the required components as illustrated in FIGS. 5a and 5b to perform the required mathematical computations. Said computing amplifiers are well known to those that are experienced in the art and, as such, will not be described or illustrated in detail.

The amplifier 110 is used for scaling purposes only. The output $V_a$ of said amplifier 110 is inserted into and differentiated by the amplifier 112 thus giving an output of $-\overset{\circ}{V}_a$. The $V_a$ output of the scaling amplifier 110 is also multiplied by $$\frac{M}{R}$$

in the amplifier 114 thus giving the output $$\frac{V_aM}{R}$$

The acceleration component $A_a$ is in the form of a 200 cycle modulated carrier. A matching amplifier 116 adjusts the amplitude of said $A_a$ signal. A demodulator 118 that utilizes a 200 cycle reference voltage from the chopper excitation 119 changes the 200 cycle modulator carrier signal $A_a$ to a D.C. voltage that is proportional to the acceleration $A_a$. The $A_a$ information is then inserted into a scaling amplifier 120 and then into the first adder 122. The output $-\overset{\circ}{V}_a$ of the amplifier 112, that is the differential of $V_a$ is also inserted into the first adder 122. The voltage $V_b$ is multiplied by the proper value in the amplifier 124 and the variable resistor 126 to produce the product $V_b\Omega_e \sin \sigma$ wherein the latitude $\sigma$ is varied in accordance with the latitude of the aircraft by moving the variable resistor 126. The last mentioned information is also inserted into the first added 122. Thus the addition of the terms $A_a - \overset{\circ}{V}_a + V_b\Omega_e \sin \sigma$ is performed within the first adder 122. The output of the first adder is then fed into a second adder 128. The output signal $$\frac{V_aM}{R}$$

of the amplifier 114 is also fed into the second adder 128. The output of the first adder 122 is also fed into an integrator 130 through a variable resistor 132. Said variable resistor 132 adjusts $T_1$ (integrating time constant) for best results. The output of the integrator 130 and the output of the second adder 128 are then combined and modulated into a 400 cycle carrier signal in the modulator 134. Resistors 129 and 131 are connected to the output of the second adder 128. The resistor 129 is variable and determines the value of the term $K_1$. By means of said variable resistor, the optimum value of $K_1$ is selected. Thus, the output $\tau_{A1}$ of the modulator 134 is equal to the roll control torque and is the solution of the first equation. The output of the modulator 134 is then fed into the Gyro A torque motor amplifier 138 and then to the Gyro A torque motor 66.

Thus, $A_a - \overset{\circ}{V}_a + V_b\Omega_e \sin \sigma$ is performed in the first adder 122 and $$\int (A_a - \overset{\circ}{V}_a + V_b\Omega_e \sin \sigma)\frac{1}{T_1}d\tau$$

is performed in the integrator 130. The result of the first equation is then added to $$\frac{V_aM}{R}$$

in the second adder 128 and this result is then added to the second mentioned equation and then modulated in the modulator 134.

The solution of the pitch control torque $\tau_{A2}$ equation is performed in a similar manner and, therefore, will not be described in detail. An examination of FIGS. 5a and 5b will reveal that the components used to solve for the control torque $\tau_{A2}$ are similar to the components that are used to solve for the roll torque $\tau_{A1}$.

Thus, the elements in the lower half of FIG. 5 are as follows: matching amplifier 150, scaling amplifiers 152 and 156, differentiator 154, demodulator 158, adders 160, 162, integrator 164, modulator 166, variable resistors 168 and 170, power amplifier 172, B gyro torque motor 174, B gyro 16, and B pickoff 64.

The gyro error resolver 176 is electrically connected to the A pickoff 62, the B pickoff 64, the pitch gimbal motor 38 through the amplifier 178 and the roll gimbal motor 46 through the amplifier 180. The gyro error resolver mechanically cooperates with the pitch motor 38, the roll motor 46, the accelerometers 2 and 4 respectively and the velocity resolver 76. The values of the resistors and condensers depend primarily upon the characteristic of the units that are used and the amplitude of signal that is desired. The various values of said resistors and condensers can readily be determined by persons experienced in the art and, as such, have not been given.

If this device is to be used within a vehicle that rapidly experiences large fluctuations of altitude, then the deleted terms $-V_c\Omega_b$ and $V_c\Omega_a$ of the roll and pitch control torque equations will have to be included. If said values are required they are included in the solution of the torque equations by inserting their values in the appropriate first adder. Thus, the value of $-V_c\Omega_b$ would be fed into the first adder 122.

Obviously many modifications and variations of the present invention are possible in the light of the above teachings. It is therefore to be understood that within the scope of the appended claims the invention may be practiced otherwise than as specifically described.

What is claimed is:
1. A stable vertical reference device comprising a gimballed gyro, accelerometer means for measuring the inertial acceleration of said vertical reference device, ground velocity measuring means including a doppler radar, computing means operable with said accelerometer means and said ground velocity measuring means to compute the algebraic sum of the inertial and ground accelerations, said computing means being operable with said gyro to precess said gyro in accordance with said computed algebraic sum.

2. A stable vertical reference device comprising a gimballed gyro, accelerometer means for measuring the inertial acceleration of said vertical reference device, ground velocity measuring means, differentiating means operable with said ground velocity measuring means to produce ground acceleration, computing means operable with said accelerometer means and said differentiating means to compute the algebraic sum of the inertial and ground accelerations, said computing means being operable with said gyro to precess said gyro in accordance with said computed algebraic sum.

References Cited in the file of this patent
UNITED STATES PATENTS

| | | |
|---|---|---|
| 2,109,283 | Boykow | Feb. 22, 1938 |
| 2,523,267 | Aschenbrenner | Sept. 26, 1950 |
| 2,591,697 | Hays | Apr. 8, 1952 |
| 2,603,767 | Ferrill | July 16, 1952 |
| 2,606,448 | Norden | Aug. 12, 1952 |
| 2,661,153 | Vance | Dec. 1, 1953 |
| 2,665,066 | Hornfeck | Jan. 5, 1954 |
| 2,752,792 | Draper | July 3, 1956 |
| 2,914,763 | Greenwood et al. | Nov. 24, 1959 |
| 3,028,592 | Parr et al. | Apr. 3, 1962 |